(12) United States Patent
Strong

(10) Patent No.: US 7,103,688 B2
(45) Date of Patent: Sep. 5, 2006

(54) DATA TRANSMISSION METHOD AND APPARATUS

(75) Inventor: Peter Strong, Mayhill (GB)

(73) Assignee: Siconnect Limited, Leatherhead (GB)

( * ) Notice: Subject to any disclaimer, the term of this patent is extended or adjusted under 35 U.S.C. 154(b) by 445 days.

(21) Appl. No.: 09/967,121

(22) Filed: Sep. 28, 2001

(65) Prior Publication Data

US 2002/0126691 A1   Sep. 12, 2002

Related U.S. Application Data

(63) Continuation of application No. PCT/GB00/01341, filed on Apr. 10, 2000.

(30) Foreign Application Priority Data

Apr. 10, 1999   (GB) ................................. 9908105.1

(51) Int. Cl.
G06F 13/42   (2006.01)
G06F 3/00    (2006.01)
G06F 11/00   (2006.01)
G06F 15/16   (2006.01)

(52) U.S. Cl. ........................ 710/106; 710/60; 714/708; 709/233

(58) Field of Classification Search ............ 710/29–30, 710/105–107; 370/471, 474, 477, 481, 493–495, 370/528; 714/708, 704, 707; 709/232–233, 709/236
See application file for complete search history.

(56) References Cited

U.S. PATENT DOCUMENTS

| 4,589,111 | A | * | 5/1986 | Adachi ........................ 714/748 |
| 5,142,550 | A | * | 8/1992 | Tymes ......................... 375/141 |
| 5,253,250 | A | * | 10/1993 | Schlafer et al. ............. 370/392 |
| 5,448,561 | A | * | 9/1995 | Kaiser et al. ................ 370/471 |
| 5,916,287 | A | * | 6/1999 | Arjomand et al. ............ 701/29 |
| 6,157,935 | A | * | 12/2000 | Tran et al. ................... 715/503 |
| 6,256,358 | B1 | * | 7/2001 | Whikehart et al. ......... 375/316 |
| 6,385,210 | B1 | * | 5/2002 | Overberg et al. ........... 370/447 |
| 6,529,957 | B1 | * | 3/2003 | Joergensen ................. 709/233 |

FOREIGN PATENT DOCUMENTS

| EP | 0 260 470 A2 | * | 3/1988 |
| EP | 0260470 | | 3/1988 |
| EP | 0 491 495 A1 | * | 6/1992 |

(Continued)

OTHER PUBLICATIONS

"Read-Only Memory" The Free On-Line Dictionary of Computing. May 9, 1995. Retrieved from Internet Jan. 27, 2005. <http://foldoc.doc.ic.ac.uk/foldoc/foldoc.cgi?query=ROM>.*

(Continued)

Primary Examiner—Mark H. Rinehart
Assistant Examiner—Thomas J. Cleary
(74) Attorney, Agent, or Firm—Harrington & Smith, LLP

(57) ABSTRACT

Apparatus and method for transmitting data messages between a plurality of stations interconnected by a bus line is disclosed, in which each message includes a frame portion and a data portion. The frame portion represents content and priority information of the data message, and the data portion represents data to be transmitted. At least one station transmits a data message having the frame portion transmitted at a first data transmission rate, and the data portion transmitted at a second data transmission rate which is not less than the first data transmission rate. The first and/or second data transmission rate is adjustable in dependence on a signal quality determined for transmission of a data message.

33 Claims, 6 Drawing Sheets

FOREIGN PATENT DOCUMENTS

| | | |
|---|---|---|
| EP | 0491495 A1 | 6/1992 |
| EP | 0 790 725 A2 | 8/1997 |
| GB | 2314487 A * | 12/1997 |
| WO | WO/00496 | 1/1988 |
| WO | WO 93/07569 | 9/1992 |

OTHER PUBLICATIONS

"ACK" The Free On-Line Dictionary of Computing. Jan. 7, 1995. Retrieved from Internet Jan. 27, 2005. <http://foldoc.doc.ic.ac.uk/foldoc/foldoc.cgi?query=ack>.*

"Header" Microsoft Press Computer Dictionary. Microsoft Press. 1994. pp. 194-195. Ref. QA 76.15.M54 1994 c.29.*

* cited by examiner

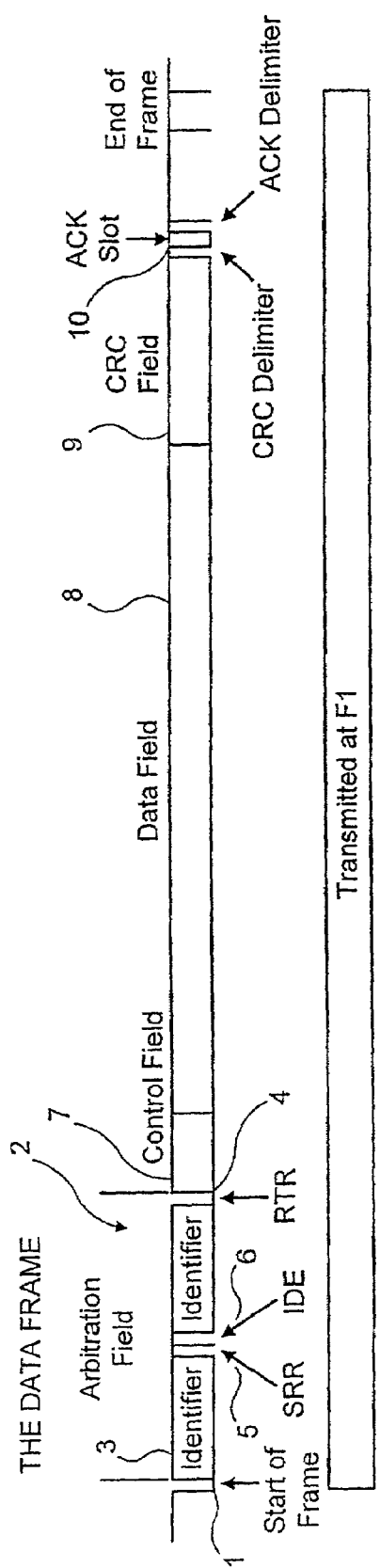
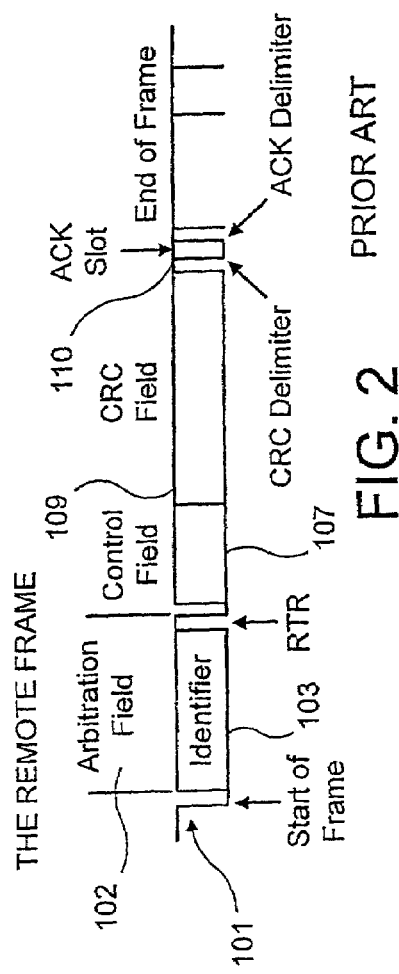

DATA TRANSMISSION METHOD AND APPARATUS

CROSS REFERENCE TO RELATED APPLICATIONS

This application is a continuation of International Application PCT/GB00/0 1341, filed on Apr. 10, 2000, and is entitled to the earliest claimed priority date of Apr. 10, 1999 of International Application PCT/GB00/01341 under 35 U.S.C. §§120, 365(c). International Application PCT/GB00/01341 is a continuation-in-part of, and claims priority from, GB Application No. 9908105.1, filed on Apr. 10, 1999.

The present application relates to a method and apparatus for transmitting a data messages in a data network including a plurality of stations interconnected by a bus line. The invention relates particularly, but not exclusively, to a method and apparatus for transmitting data between computers interconnected by electrical power lines.

A method for operating a data processing arrangement for motor vehicles in which the data processing arrangement includes at least two computers and a bus line connecting the computers for transmitting data messages is disclosed in U.S. Pat. No. 5,001,642 and U.S. Pat. No. 5,524,213. The method disclosed in the above-mentioned U.S. Patents operates according to a protocol known as CAN (Controller Area Network), the details of which are disclosed in ISO (International Standards Organisation) Specification No 11898.

A data message of known type is shown in FIG. 1. The data message includes a start of frame part (1) which indicates to the data network that a message has started, and an arbitration field (2) which determines the priority of the message when two or more nodes of the network are contending for the data bus. In a first version, the arbitration field (2) contains an 11 bit identifier (3) and a remote transmission request (RTR) bit (4), which is dominant for data frames and recessive for remote frames (the significance of which will be described below). Alternatively, in a second version, the identifier (3) can be a 29 bit identifier containing 2 bits substitute remote request (SRR) and identifier extension (IDE). The SRR bit 5 gives priority to the version discussed above if, on a network carrying messages of both versions, both messages have the same 11 bit identifier. The IDE bit (6) differentiates between 29 bit identifiers (which are recessive) and 11 bit identifiers (which are dominant).

The data message also includes a control field (7) which contains for the first version discussed above the identifier extension bit plus one reserved bit (r0), both set to dominant, and a 4 bit data length code (DLC) part which represents the number of bytes in a data field (8) of the message. In the second version, the control field 7 also includes 2 reserved bits (r1 and r0) which are set to dominant, and a 4 bit data length code, also representing the number of bytes in the data field (8). The data field (8) contains zero to eight bytes of data.

Following the data field (8), a CRC (Cyclic Redundancy Check) field (9) contains a 15-bit checksum calculated on significant parts of the message and is used for error detection. An acknowledgement slot (10) then follows the CRC field (9). Any controller that has been able to correctly receive the data message sends an acknowledgement bit during the acknowledgement bit time, and the device transmitting the message checks for the presence of the acknowledgement bit. If an acknowledgement bit is detected, the next data frame is sent, but if no acknowledgement bit is detected, the device re-transmits the data frame. Prior to re-transmission, the node transmits an error frame, then waits for 8 times the frame bit rate period before re-transmitting.

FIG. 2 shows a remote frame for use with the data frame shown in FIG. 1, and parts common to the frame of FIG. 1 are denoted by like reference numerals but increased by 100. The remote frame is similar to the data frame in that it incorporates a start of frame 101, an arbitration field 102 having an identifier 103, a control field 107, a CRC field 109 and an acknowledgement slot 110. However, the remote frame does not contain a data field, and the RTR bit in the arbitration field is recessive for the purpose of explicitly marking the frame as a remote frame.

The purpose of the remote frame is to solicit the transmission of the corresponding data frame. For example, if a node A transmits a remote frame with its arbitration field 102 set to 234, then node B, if properly initialised, may respond with a data frame having its arbitration field (2) also set to 234.

FIG. 3 shows an error frame for use in the network on which the frames of FIGS. 1 and 2 are transmitted. The error frame is transmitted when a node detects a fault, and causes all other nodes to detect a fault so that they also send error frames. The message transmitter then automatically tries to re-transmit the message, and a scheme of error counters ensures that a node is unable to destroy the traffic on the data bus by repeatedly transmitting error frames.

The error frame includes an error flag (20) consisting of 6 bits of the same value (which thus violates the bit-stuffing rule, as will be familiar to persons skilled in the art), and an error delimiter (21) comprising 8 recessive bits. The error delimiter provides a space in which other nodes on the bus can send their error flags when they detect the first error flag. Finally, an overload frame (not shown) may be used, and is similar in format to the error frame discussed above. The overload frame is transmitted by a node that becomes too busy.

The prior art arrangement discussed above suffers from the drawback that the rate at which data can be reliably transmitted across the network is limited by the distances the data must travel between nodes of the network. When messages consisting of small amounts of data are transmitted across small distances (for example data representing physical measurements in a motor vehicle transmitted around a data bus located in the vehicle) this does not cause any significant difficulty. However, if larger amounts of data need to be transmitted over larger distances (for example transmission of large amounts of data between computers separated by significant distances), then the rate at which data can be transmitted prevents the prior art arrangement discussed above from being practicable. In particular, the prior art arrangement discussed above can only transmit a maximum of 8 bytes per data frame and the number of data bits per data frame divided by the maximum distance in meters times the data bit rate (the payload) is limited to 1.6.

Preferred embodiments of the present invention seek to overcome the above disadvantages of the prior art.

According to a first aspect of the present invention, there is provided a method of transmission of data messages between a plurality of stations interconnected by a bus line, wherein each said message includes a frame portion representing content and priority information of the data message and a data portion representing data to be transmitted, the method comprising the steps of causing at least one said station to transmit a data message on to the bus line such that said frame portion thereof is transmitted at a first data transmission rate, and the data portion thereof is transmitted at a second data transmission rate not less than said first data transmission rate, and adjusting said first and/or second data transmission rate in dependence on a signal quality determined for transmission on said bus line.

According to a second aspect of the invention, there is provided apparatus for transmitting data messages between a plurality of stations interconnected by a bus line, each of said data messages including a frame portion representing content and priority information of the data message and a data portion representing data to be transmitted, the apparatus comprising:

means for transmitting a data message on said bus line such that said frame portion thereof is transmitted at a first data transmission rate, and said data portion thereof is transmitted at a second data transmission rate not less than said first data transmission rate; and means for adjusting said first and/or second data transmission rate in dependence on signal quality determined for transmission on said bus line.

The present invention is based on the very surprising discovery that by transmitting the data portion of a data message at a second data transmission rate which may be higher than the first data transmission rate at which the frame portion of the message is transmitted, the rate of transmission of data can be significantly improved compared with the prior art, without significant lowering of the distances over which data can be reliably transmitted (which would be the case if the entire data message were to be transmitted at the second transmission rate). For example, whereas the payload for known arrangements is limited to 1.6, the payload for arrangements embodying the present invention can be as high as 102.4.

Further, adjustable data rate transmission provides the advantage of enabling the network to automatically adjust itself to the first and second data transmission rates which provide the most advantageous balance between speed and reliability of transmission.

In a preferred embodiment, at least one further station transmits onto the bus line an acknowledgement signal indicating receipt of a said data message.

Preferably, at least one said station transmits a further said data message in response to transmission of a said acknowledgement signal.

This provides the advantage that further messages can be transmitted onto the network immediately after the previous message is correctly received.

More preferably, a said message is re-transmitted if no acknowledgement signal is received.

Yet more preferably, an error message is generated prior to re-transmission of said message.

In a preferred embodiment, said first and/or second data transmission rate is adjusted in response to the frequency of generation of said error messages. In such an embodiment, signal quality may be determined by the frequency of generation of said error messages.

In another embodiment, the frequency of received messages comprising an error is determined and the first and/or second data transmission rate is adjusted in dependence on said frequency. Thus, the signal quality is determined by the quality of the received messages.

Preferably, received signal strength is determined, and said first and/or second data transmission rate is adjusted in dependence on the received signal strength alone or in combination with the frequency of received data messages comprising an error.

Suitable means for determining errors is a Cyclic Redundancy Checker. A processor may be configured to determine the adjustment of the first and/or second data transmission rate.

Suitably, the processor is configured by a computer program to implement the embodiments of the invention. The computer program may be supplied on any suitable carrier medium such as magnetic storage media, optical storage media, solid-state storage media or provided over a communications carrier medium such as a radio frequency carrier or optical carrier signal.

Suitably, said frame portion contains information representing a station to which the message is directed.

This provides the advantage of enabling the network to be arranged such that only an addressed node or nodes responds to a particular message.

The frame portion may contain information representing the size of the corresponding data portion.

The second data transmission rate may be an integral multiple of said first data transmission rate.

A preferred embodiment of the invention will now be described, by way of example only and not in any limitative sense, with reference to the accompanying drawings, in which;

FIG. 1 is a prior art data message;

FIG. 2 is a remote frame for use in conjunction with the data message of FIG. 1;

Figure 4:
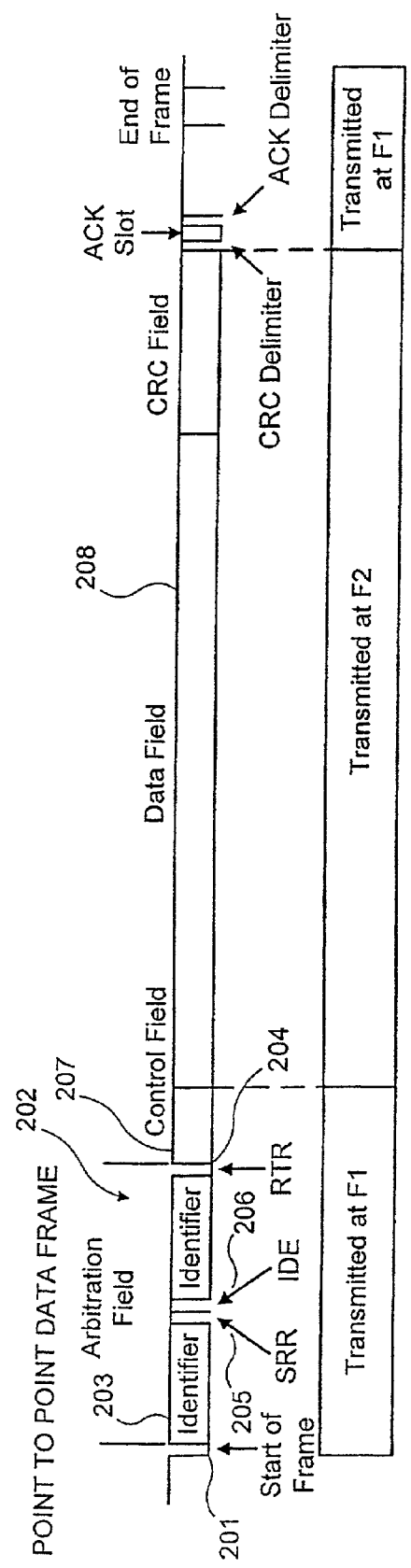
FIG. 4 is a data message for use in a message embodying the present invention.

Referring to FIG. 4, a data frame for use in a method embodying the present invention has a start of frame 201, arbitration field 202 containing an identifier 203, RTR bit 204 substitute remote request bit 205 and identifier extension bit 206. These features operate in a similar manner to the corresponding features of the prior art data frame of FIG. 1, with the exception that the arbitration field 203 may contain information regarding the transmit and receive node identification, the size of data field 208 and the rate of transmission of the data contained in the data field 208.

The message also has a control field 207 which includes a data length code (DLC), the fourth bit of which may contain information regarding the size of the data field 208. The data field may be increased in size from 8 bytes in the prior art data field to 2048 bytes. If the rate of transmission F2 of the data in the data field 208 is an integral multiple of the rate of transmission of the data in the arbitration field 203 and control field 207, the multiplier may be set by the unused r0 and r1 bits of the control field 207. F1 bit rates are typically from 10Kbit to 1Mbit, and F2 bit rates are typically from 10Kbit to 8Mbit, although these bit rates may be changed arbitrarily depending on the particular construction of the network.

When the network is initially set up, the user may configure the F1 and F2 bit rates to particular values, and then by monitoring the rate of production of error frames during test transmissions determine the most reliable F1 and F2 bit rates to set for the particular network. A table containing a guideline for the initial settings may be provided, the table based upon the lengths of cable in the network. A test program to automate the task of setting F1 and F2 may also be provided, and these settings may then be stored in a non-volatile memory and thus be available for reuse each time the device is switched on.

A device containing a node operating using the method of the present invention may use a low level device driver to automate the task of setting F1 and F2. By repeatedly running the program of the low level device driver during a network session, the node can update the F1 and F2 bit rates held in the non-volatile memory to higher or lower values, depending upon the signalling conditions on the physical network at that time. This ensures that transmission bit rates are optimised adaptively for reliability and speed.

The embodiment described above includes in the arbitration field 202 a number of coded bits to identify the transmitting node and the identity of the intended receiving node or nodes. When all nodes receive the data frame, they compare the bits in the arbitration field 202 with the bits and their message address filter (as will be familiar to persons skilled in the art) to determine whether the data frame is addressed to them or not. If not, they switch to a passive mode, which ensures that only the node that the message is intended for will acknowledge the message if it is received without error. The transmitter may then determine that the message was received by the correct node, without error, and not simply by just any node on the network.

Figure 3:
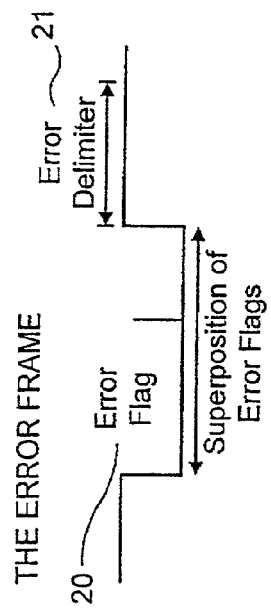
FIG. 3 is an error frame for use in conjunction with the data message of FIG. 1 and remote frame of FIG. 2.

The 4 bit data length code within the control field 207 has seven unused values in the prior art arrangement discussed with reference to FIGS. 1 to 3 (9 to F hexadecimal). In the present invention, these unused values can be used to indicate a number of bytes in the data field as shown in Table 1 below:

| DLC Value in Hex | Data Field Length in Bytes |
|---|---|
| 0 to 8 | 0 TO 8 |
| 9 | 32 |
| A | 64 |
| B | 128 |
| C | 256 |
| D | 512 |
| E | 1024 |
| F | 2048 |

An alternative method of indicating the number of bytes in the data field 208 may be to use any of the 29 bits available in the identifier 203 in a predetermined pattern. This alternative method may be used to increase the number of different data field bytes available to the user.

As pointed out above, the 2 reserved bits in the control field 207 may be used to indicate that the data transmission rate F2 of the data field 208 is an integral multiple of the data transmission rate F1 of the arbitration field 202 and control field 207. This may be carried out according to Table 2 below:

| Control Field | r1 | r0 | Multiplier | F2 Bit Rate |
|---|---|---|---|---|
| | 0 | 0 | 1 | F1 |
| | 0 | 1 | 2 | 2 × F1 |
| | 1 | 0 | 4 | 4 × F1 |
| | 1 | 1 | 8 | 8 × F1 |

An alternative method of indicating the bit rate F2 may be to use any of the 29 bits available in the identifier 203 in a predetermined pattern.

Figure 5A:
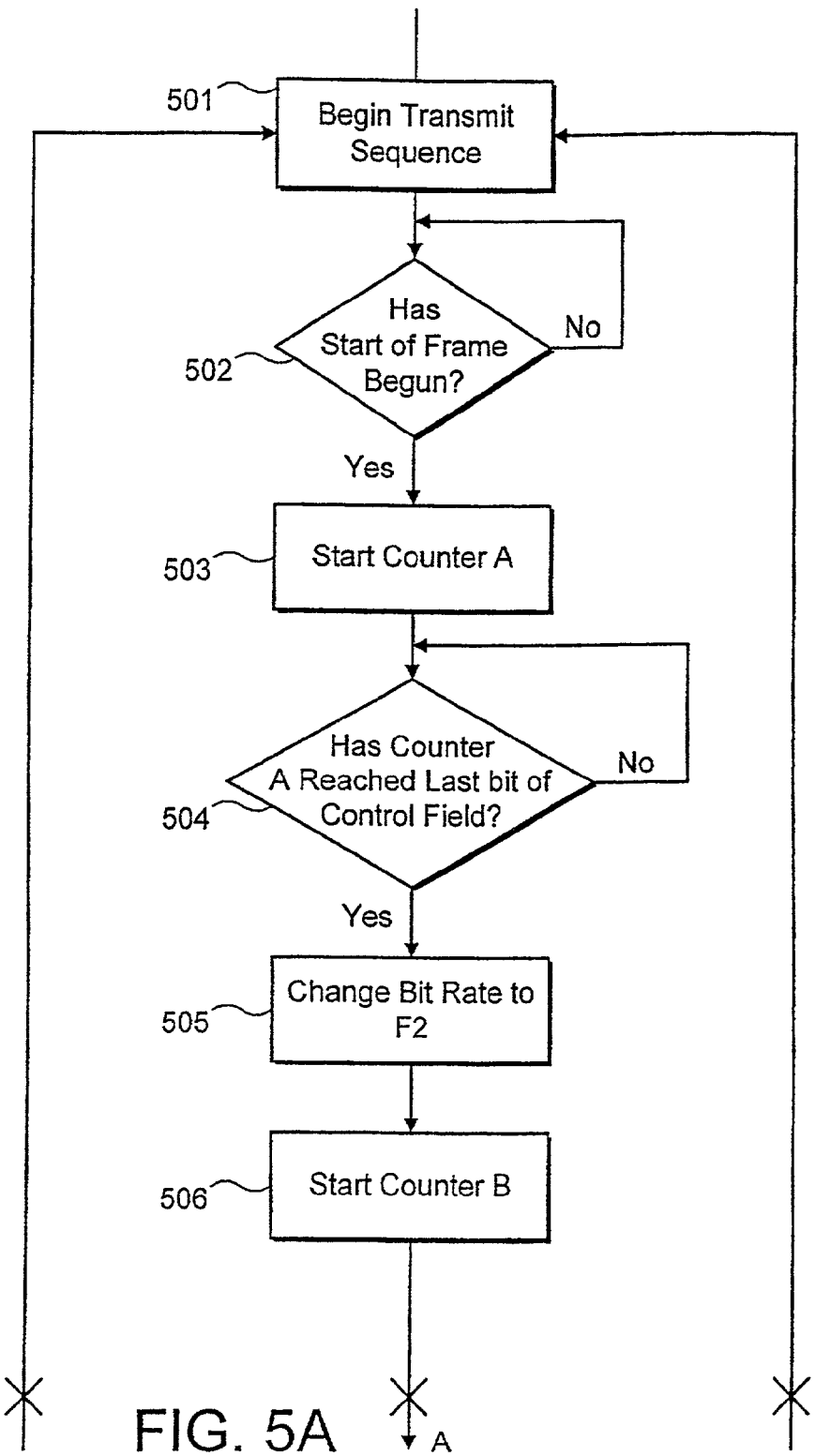
FIGS. 5A and 5B are a flow diagram showing the switching between the first and second data transmission rates of the method embodying the present invention.
Figure 5B:
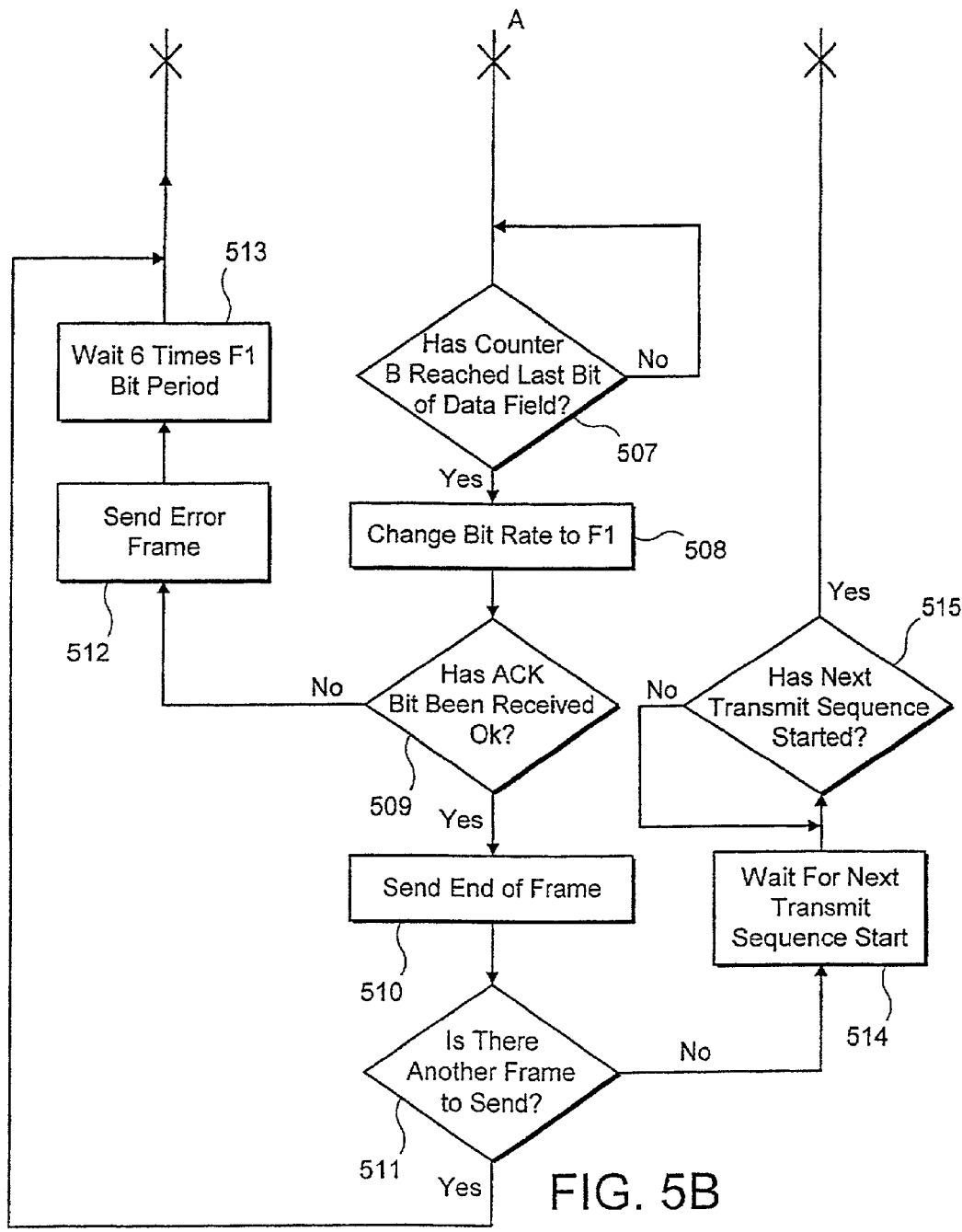

Referring to FIGS. 5A and 5B, which show a flow chart relating to the method of switching from data transmission rate F1 to F2 and vice versa, frame headers and footers are transmitted at the F1 bit rate, as shown in FIG. 4. Before a frame is transmitted, the transmit clock of the relevant transmitter checks a register in a non-volatile memory containing the current F1 bit rate value, and the transmit clock is set to this value for all frame bits. In particular, the transmit sequence begins at Step 501, and if the start of frame portion 201 has begun at Step 502, a counter A is started at 503, otherwise the transmitter returns to Step 502.

After the counter A has started, it is determined at Step 504 whether the counter A has reached the last bit of the control field 208. When the counter detects that the last bit of the control field 208 has been sent, the transmit clock then checks a register in non-volatile memory containing the current F2 bit rate value and the transmit clock is then changed to F2 at Step 505. A counter B is started at Step 506, and when the counter detects at Step 507 that the last CRC bit has been sent, the transmit clock is reset to F1 at Step 508 for the remainder of the frame.

When an acknowledgement bit has been received at Step 509, the end frame portion is sent at Step 510, and a determination is made at Step 511 whether another frame is to be sent. If another frame is to be sent, the process returns to Step 501. If, on the other hand, no acknowledgement bit is received at Step 509, an error frame is sent at Step 512 and after waiting six times the F1 bit period at Step 513, the process returns to Step 501. If no other frame is to be sent at Step 511, the apparatus waits for the next transmit sequence to start at Step 514, and when the next transmit sequence starts at Step 515, the apparatus returns to Step 501.

An example of apparatus for a node or station capable of updating the $F_1$ and $F_2$ bit rates held in the non-volatile memory to higher or lower values, depending on the signalling conditions of the network will now be described with reference to FIG. 6 of the drawings.

Figure 6:
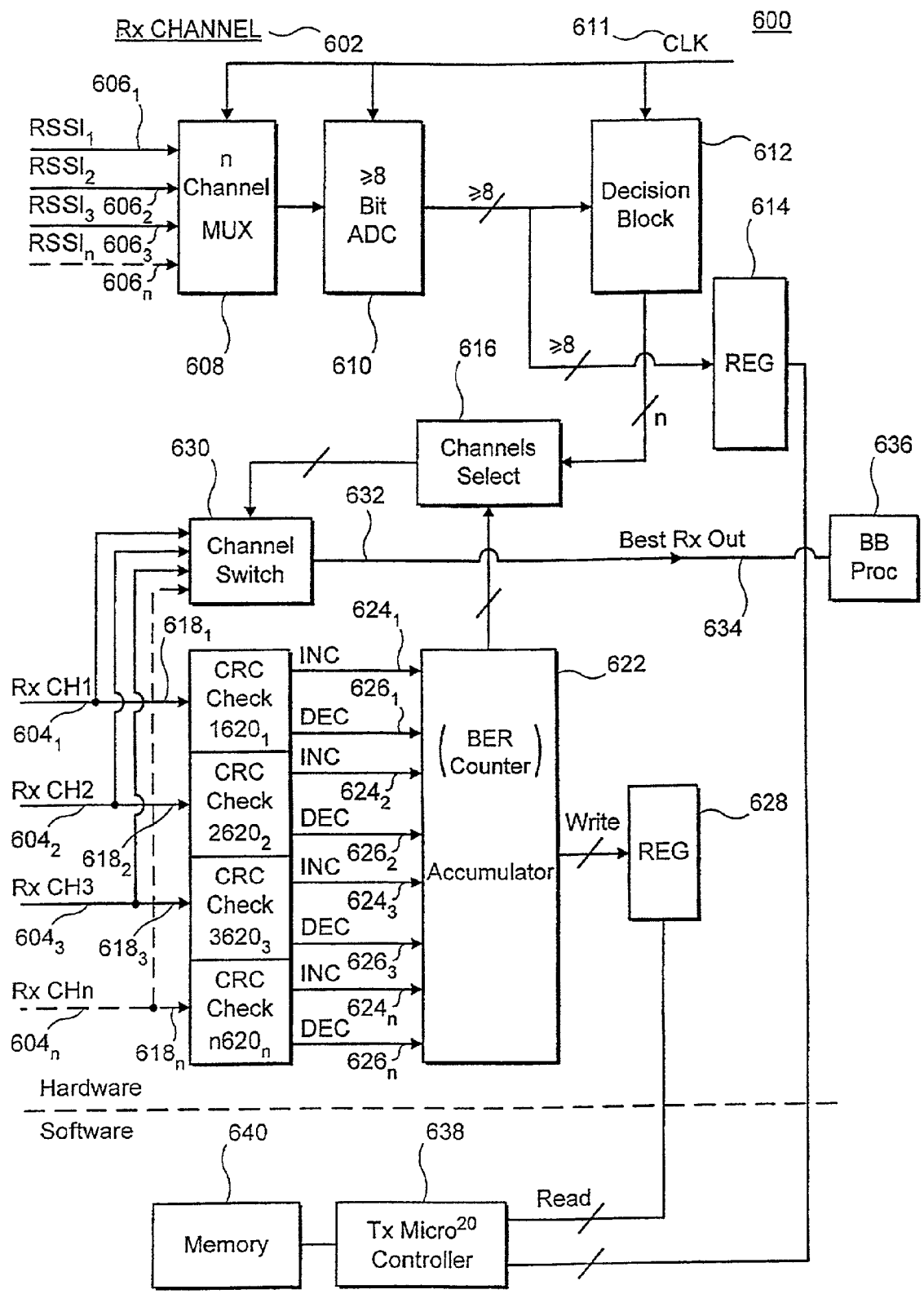
FIG. 6 is a block diagram of apparatus embodying the present invention.

In accordance with an embodiment of the invention, a network node or station comprises apparatus 600 as illustrated in FIG. 6. The apparatus 600 resides in the receive side of the network node.

Receive (RX) channel 602 input to apparatus 600, comprises a plurality of receive channels $604_1 \ldots 604_n$ ($RXCH_1 \ldots RXCH_n$) network for each network node. In this example, each node includes a discrete multi-tone transmitter to transmit data messages using frequency diversity. A plurality of Received Signal Strength Indicators $606_1 \ldots 606_n$ ($RSSI_1 \ldots RSSI_n$) are derived from respective receive channels $604_1 \ldots 604_n$, and input to an n channel demultiplexor (MUX 608). The output of MUX 608 is coupled to Analogue to Digital Converter (ADC) 610, which converts the varying analogue voltage present at the time of conversion on each of the inputs into the digital domain of 8 bits or more. N channel MUX 608 and ADC 610 are synchronised to a clock signal 611.

The ADC 610 output for each RSSI $606_1 \ldots 606_n$ is fed to a decision block 612 and to an RSSI register 614. The decision block 612 determines the channel having the greatest RSSI and outputs the result to Channel Selector 616.

A plurality of serial data bit streams $618_1 \ldots 618_n$ comprising message frames and corresponding to respective receive channels $604_1 \ldots 604_n$ are input to respective Cyclic Redundancy Checkers (CRCs) $620_1 \ldots 620_n$. The cyclic redundancy (CR) bits transmitted in the CRC field of the point to point data frame for each channel, for example, are compared with the CR bits calculated in the corresponding CRC $620_1 \ldots 620_n$ for the transmitted data. When the CR comparator in respective CRCs $620_1 \ldots 620_n$ outputs a TRUE value it decrements 1or more from a corresponding value held in an accumulator 622 and for a FALSE value it increments the value. In a particular example, signals representative of an increment or decrement are sent over respective signal lines $624_1 \ldots 624_n$ and $626_1 \ldots 626_n$. Accumulator 602 functions as a bit error rate counter.

An output of accumulator 622 is fed to channel selector 616 and another output is fed to an error register 628.

Channel selector 616 has an output coupled to Channel Switch 630. Based on values received from the channel selector 616. Channel selection is determined by looking for the best combination of high RSSI and low BER for each channel. Channel switch 630 switches one of the plurality of data streams $618_1 \ldots 618_n$ to its output 632. The output data stream is termed "Best Data Bit Stream" 634 and is fed to a baseband processor 636 of the node apparatus 600.

The apparatus 600 also includes a processor 638 such as a microcontroller, microprocessor or some other programmable (intelligent) machine or combination thereof. Processor 638 reads the contents of RSSI register 614 and error register 628 from time to time as determined by software or programmed instructions for the processor. Preferably, the register contents are read on a regular periodic basis in order to determine a frequency at which errors and/or poor signal quality occur for the channels $604_1 \ldots 604_n$. The processor determines the optimum F1, F2 and Data Code Length (DLC) i.e. the number of bytes to be transmitted in subsequent message frames, from the values read from register 614 and 628. Processor 638 adaptively configures F1, F2 and DLC to achieve optimum data payload transmission.

Processor 638 functions under computer program control which configures the processor to operate in accordance with the method of embodiments of the invention described above. In a preferred embodiment, the computer program is stored in solid state memory 640 associated with the processor. However, the computer program may be stored on any suitable medium such as magnetic disc or tape, or optical disc, and also may be transferred to the processor 638 over a communications carrier medium such as a radio frequency or optical signal carrier.

Figure 7:
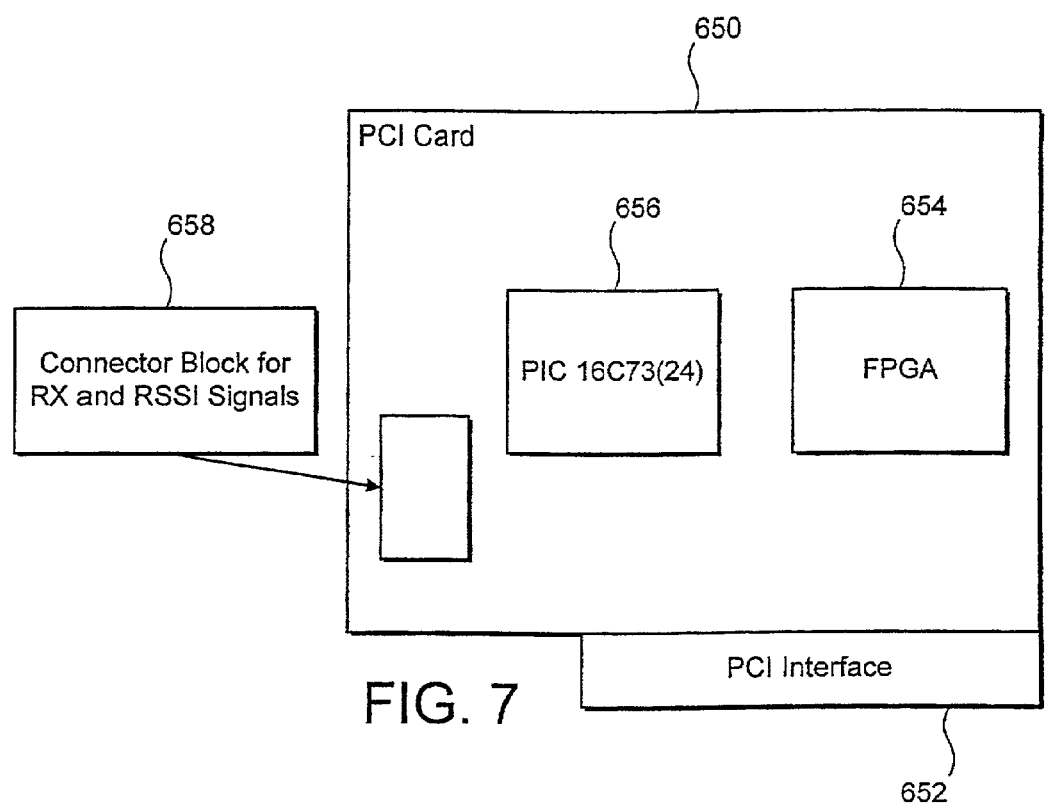
FIG. 7 illustrates an implementation of an embodiment of the present invention.

An example of an implementation of an embodiment of the invention will now be described with reference to FIG. 7.

A Quicklogic PCI FPGA board 650 has been constructed which plugs into a PCI 652 slot on an IBM compatible personal computer (not shown). A Field Programmable Gate Array (FPGA) 654 comprises a state machine coded in VHDL to configure the FPGA 654 to implement the functions described above, together with the baseband processor and a microcontroller 656, which in this implementation is an Arizona Microchip PICI6C73. The microcontroller 656 includes an 8 bit ADC 610, RSSI register 614 and error register 628. PIC card 650 also includes a connector block 658 for coupling external signals to the PIC 656 and FPGA 654.

Suitably, the implementation may be on a 0.35 micron CMOS ASIC.

It will be appreciated by persons skilled in the art that the above embodiment has been described by way of example only and not in any limitative sense, and that various alterations and modifications are possible without departure from the scope of the invention as defined by the appended claims.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during the prosecution of this application or of any such further application derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method of transmission of data messages between a plurality of stations interconnected by a bus line, wherein each said message comprises a frame portion representing content and priority information of the data message and a data portion representing data to be transmitted, the method comprising the steps of:
   causing at least one of said plurality of stations to transmit a data message on to the bus line such that said frame portion thereof is transmitted at a first data transmission rate, and the data portion thereof is transmitted at a second data transmission rate not less than said first data transmission rate;
   receiving information relating to signal quality on said bus line;
   determining whether to adjust the first data transmission rate in dependence on the information relating to signal quality on the bus line;
   determining whether to adjust the second data transmission rate in dependence on the information relating to signal quality on the bus line; and
   adjusting at least one of said first data transmission rate or said second data transmission rate in dependence on said determinations.

2. A method according to claim 1, further comprising the step of causing at least one further station to transmit onto the bus line, an acknowledgement signal indicating receipt of a said data message.

3. A method according to claim 2, further comprising the step of causing at least one said station to transmit a further said data message in response to transmission of a said acknowledgement signal.

4. A method according to claim 2, further comprising the step of retransmitting a said message if no acknowledgment signal is received.

5. A method according to claim 4, further comprising the step of generating an error message prior to re-transmission of said message.

6. A method according to claim 5, wherein determining whether to adjust said first data transmission rate and said second data transmission rate is further made in dependence on the frequency of generation of said error messages.

7. A method according to claim 1, further comprising the step of determining a frequency of received data messages comprising an error, wherein the frequency of received data messages comprising an error comprises, at least in part, the information relating to signal quality on said bus line; and wherein determining whether to adjust said first data transmission rate and said second data transmission rate is made is made, at least in part, in dependence on the frequency of received data messages comprising an error.

8. A method according to claim 7, further comprising determining received signal strength for a data message, wherein said received signal strength comprises, at least in part, the information relating to signal quality on said bus line; and wherein determining whether to adjust said first data transmission rate and said second data transmission rate is made, at least in part, in dependence on said received signal strength determination in combination with said frequency of received data messages comprising an error.

9. A method according to claim 1, wherein said frame portion contains information representing a station to which the message is directed.

10. A method according to claim 1, wherein the frame portion contains information representing the size of the corresponding data portion.

11. A method according to claim 1, wherein the second data transmission rate is an integral multiple of said first data transmission rate.

12. A method according to claim 1 wherein the frame portion contains information representing the transmit node identification.

13. Apparatus for transmitting data messages between a plurality of stations interconnected by a bus line, each of said data messages including a frame portion representing content and priority information of the data message and a data portion representing data to be transmitted, the apparatus comprising:
 means for processing programmed instructions;
 means for transmitting a data message on said bus line such that said frame portion thereof is transmitted at a first data transmission rate, and said data portion thereof is transmitted at a second data transmission rate not less than said first data transmission rate;
 means for receiving information relating to signal quality on said bus line;
 means for determining whether to adjust the first data transmission rate in dependence on the information relating to signal quality on the bus line;
 means for determining whether to adjust the second data transmission rate in dependence on the information relating to signal quality on the bus line; and
 means for adjusting at least one of said first data transmission rate or said second data transmission rate in dependence on said determinations.

14. Apparatus according to claim 13, further comprising means responsive to receiving a data message to transmit an acknowledgement signal on said bus line.

15. Apparatus according to claim 14, further comprising means for retransmitting a message if no acknowledgment signal is received.

16. Apparatus according to claim 15, further comprising means for generating an error message prior to re-transmission of said message.

17. Apparatus according to claim 16, wherein said means for determining whether to adjust said first data transmission rate and said second data transmission rate make said determinations in dependence on a frequency of generation of said error messages, wherein said frequency of generation of said error messages comprises, at least in part, information relating to the signal quality on said bus line.

18. Apparatus according to claim 13, further comprising means responsive to an acknowledgment signal to transmit a further said data message.

19. Apparatus according to claim 13, further comprising means for determining whether a data message comprises an error, wherein information concerning whether a data message comprises an error comprises, at least in part, information relating to signal quality on the bus line.

20. Apparatus according to claim 19, said means for determining whether a data message comprises an error including a Cyclic Redundancy Checker.

21. Apparatus according to claim 20, further comprising an error register for holding a value indicative of the level of received messages comprising an error, and means for decrementing said value for a received data message determined not to comprise an error and incrementing said value for a received data message determined to comprise an error.

22. Apparatus according to claim 21, wherein said means for determining whether to adjust said first and second data transmission rates each further comprise processing means for determining whether to adjust said first data transmission rate and said second data transmission rate in dependence on the content of said error register.

23. Apparatus according to claim 13, further comprising a received signal strength measurement unit for measuring signal strength of a received data message, wherein said signal strength of a received data message comprises, at least in part, information relating to signal quality on said bus line.

24. Apparatus according to claim 23, a signal strength register for holding a value representative of received signal strength.

25. Apparatus according to claim 23, further comprising wherein said means for determining whether to adjust said first and second data transmission rates further comprise processing means for determining whether to adjust said first data transmission rate and said second data transmission rate in dependence on the content of said signal strength register.

26. Apparatus according to claim 13, further comprising:
 means for determining whether a data message comprises an error;
 an error register for holding a value indicative of the level of received messages comprising an error;
 a received signal strength measurement unit for measuring signal strength of a received data message;
 a signal strength register for holding a value representative of received signal strength; and
 processing means configured to determine whether to adjust said first data transmission rate and said second data transmission rate in dependence on the content of said signal strength register.

27. Apparatus according to claim 13, wherein said frame portion contains information representing a station to which the message is directed.

28. Apparatus according to claim 13, wherein the frame portion contains information representing the size of a corresponding data portion.

29. Apparatus according to claim 13, wherein the second data transmission rate is an integral multiple of said first transmission rate.

30. Apparatus according to claim 13, wherein the frame portion contains information regarding the transmit node identification.

31. Apparatus according to claim 13, wherein said means for transmitting a data message is operable to transmit a data message such that said frame portion thereof further represents transmitted identification information.

32. An article of manufacture comprising:
 a computer useable storage medium having a computer readable code means tangibly embodied in said medium for transmitting data messages between a plurality of stations interconnected by a bus line, wherein each message includes a frame portion representing content and priority information of the data message and a data portion representing data to be transmitted, the computer readable program code in said article of manufacture comprising:

computer readable program code means for causing the computer to cause at least one of said plurality of stations to transmit a data message onto the bus line such that said frame portion thereof is transmitted at a first transmission rate, and the data portion thereof is transmitted at a first data transmission rate, and the data portion thereof is transmitted at a second data transmission rate not less than said first data transmission rate;

computer readable program code means for receiving information relating to signal quality of said bus line;

computer readable program code means for causing the computer to determine whether to adjust said first transmission rate and said second transmission rate in dependence on the signal quality determined for transmission on said bus line; and computer readable program code means for adjusting at least one of said first data transmission rate or said second data transmission rate in dependence on said determinations.

33. The article of manufacture of claim 32 where the computer useable medium comprises a magnetic storage medium, an optical storage medium, or solid state storage medium.

* * * * *